United States Patent
Schaefer-Lorinser et al.

(10) Patent No.: US 7,113,592 B1
(45) Date of Patent: Sep. 26, 2006

(54) METHOD AND DEVICE FOR LOADING INPUT DATA INTO A PROGRAM WHEN PERFORMING AN AUTHENTICATION

(75) Inventors: Frank Schaefer-Lorinser, Ober-Ramstadt (DE); Alfred Scheerhorn, Meppen (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/202,024

(22) PCT Filed: Dec. 20, 1997

(86) PCT No.: PCT/EP97/02894

§ 371 (c)(1),
(2), (4) Date: Aug. 25, 1999

(87) PCT Pub. No.: WO97/46983

PCT Pub. Date: Dec. 11, 1997

(30) Foreign Application Priority Data

Jun. 5, 1996 (DE) .............................. 196 22 533

(51) Int. Cl.
*G06F 17/60* (2006.01)

(52) U.S. Cl. .................... 380/28; 380/203; 380/43; 380/46; 380/50; 705/50; 705/35; 705/68; 705/75; 705/79

(58) Field of Classification Search ............ 705/64, 705/65, 67, 41, 50; 380/46, 265, 268, 43; 235/380
See application file for complete search history.

(56) References Cited

U.S. PATENT DOCUMENTS

| | | | | |
|---|---|---|---|---|
| 3,719,927 A * | 3/1973 | Michels et al. | ............... | 340/5.4 |
| 4,786,790 A | 11/1988 | Kruse et al. | ................ | 235/380 |
| 5,136,642 A * | 8/1992 | Kawamura et al. | ......... | 380/282 |
| 5,365,585 A * | 11/1994 | Puhl et al. | ................... | 380/265 |
| 5,450,491 A * | 9/1995 | McNair | ....................... | 235/380 |
| 5,534,683 A | 7/1996 | Rankl et al. | ................ | 235/380 |
| 5,572,004 A * | 11/1996 | Raimann | ..................... | 235/380 |
| 5,588,090 A * | 12/1996 | Furuta et al. | ................. | 706/25 |
| 5,613,001 A * | 3/1997 | Bakhoum | .................... | 380/254 |
| 5,633,930 A | 5/1997 | Davis et al. | .................. | 380/24 |
| 5,664,016 A * | 9/1997 | Preneel et al. | ................ | 380/28 |
| 5,703,952 A * | 12/1997 | Taylor | .......................... | 380/43 |
| 5,790,666 A * | 8/1998 | Ooi | ............................. | 380/239 |
| 5,889,266 A * | 3/1999 | Schrenk | ...................... | 235/375 |
| RE36,181 E * | 4/1999 | Koopman et al. | .......... | 713/168 |
| 5,907,832 A * | 5/1999 | Pieterse et al. | ............... | 705/39 |
| 5,943,423 A * | 8/1999 | Muftic | ........................ | 705/67 |
| 5,995,629 A * | 11/1999 | Reiner | ........................... | 380/1 |

(Continued)

FOREIGN PATENT DOCUMENTS

DE 1477162 A2 * 7/1985

(Continued)

OTHER PUBLICATIONS

Matsumot Craig, Crypto confab to dabate US Move on Export, Jan. 18, 1999, electronics engineering times,pp. 4 and 14.*

(Continued)

*Primary Examiner*—Firmin Backer
(74) *Attorney, Agent, or Firm*—Kenyon & Kenyon LLP

(57) ABSTRACT

A method for enhancing data security when chip cards are used for payment transactions and input data are loaded into an algorithm when performing an authentication. The security of the debit and credit data is enhanced by subdividing the data blocks and by switching an additional feedback on and off following the downstream counters at preselected clock pulse times. The method is applicable to all authentication processes in conjunction with chip cards.

15 Claims, 5 Drawing Sheets

U.S. PATENT DOCUMENTS

| | | | |
|---|---|---|---|
| 6,014,446 A | * | 1/2000 | Finkelstein .................. 380/46 |
| 6,560,338 B1 | * | 5/2003 | Rose et al. .................... 380/47 |
| 2001/0030236 A1 | * | 10/2001 | Schilling .................... 235/451 |

FOREIGN PATENT DOCUMENTS

| | | |
|---|---|---|
| DE | 38 18 960 | 12/1988 |
| DE | 41 19 924 | 12/1992 |
| DE | 4243851 | 6/1994 |
| DE | 4333388 | 4/1995 |
| DE | 44 19 805 | 12/1995 |
| DE | 4437283 | 3/1996 |
| DE | 195 45 705 | 6/1997 |
| EP | 0 409 701 | 1/1991 |
| EP | 0 605 070 | 7/1994 |
| EP | 0 616 429 | 9/1994 |
| EP | 06 24 839 | 11/1994 |
| FR | 2 471 003 | 6/1981 |
| WO | WO 01/15090 A1 * | 1/2001 |

OTHER PUBLICATIONS

* ETSI D/EN/TE 090114, Identification Card Systems—Telecommunications Integrated Circuits(s) Cards and Terminals, Part 4: Application Independent Card Related Terminal Requirements; German Version En 726—4: 1994.

**Weimann, Juergen, "Risiken und Sicherheitspotentiale der Chipkarte," In: CR 12, 1988, pp. 1037-1041.

* cited by examiner

Providing a device for loading input data into a program when performing an authentication using a cryptographic MAC function and including a first counter. — 200

Providing in the device a linear-feedback shift register having a nonlinear feed-forward function for reading off from the linear-feedback shift register and for influencing an output of the linear feedback shift register using the first counter, the linear-feedback shift register forming at least part of a circuit. — 202

Providing in the device at least one second counter for performing the program connected downstream of the linear-feedback shift register — 204

Providing in the device an additional non-linear feedback shift register for cryptographically enhancing the circuit and being connected to the circuit, the at least one additional nonlinear feedback shift register being disconnectable. — 206

Providing in the device a latch. — 208

Providing in the device additional feedback generated as an XOR sum of readouts following a first of the at least one second downstream counter before the latch, from the latch following the first of the at least one second downstream counter, and following a second of the at least one second downstream counter. — 210

FIG. 5

METHOD AND DEVICE FOR LOADING INPUT DATA INTO A PROGRAM WHEN PERFORMING AN AUTHENTICATION

FIELD OF THE INVENTION

The present invention relates generally to a method for loading input data into a program when performing an authentication, and, in particular, to a method for loading input data into a program when performing an authentication between electronic cash cards and a security module.

RELATED TECHNOLOGY

Various prior methods are used for electronic cash cards in a plurality of variants, with devices being based on, among other things, chip circuits as purportedly referred to by European Patent Application Number 0 616 429.

Related methods may be described, for example, in ETSI D/EN/TE 090114, Terminal Equipment (TE) Requirements for IC Cards and Terminals for Telecommunication Use, Part 4—Payment Methods, version 4, of Feb. 7, 1992, and in the European Patent Application Number 0 605 070.

In addition to phone cards, which have a defined initial credit balance as a payment means for card-operated phones, "electronic cash cards", which work according to the same principle, are gaining in significance as a means for paying limited amounts. In "pay with chip card" applications, a card reader module having a security module SM for verifying the card and the balance amount are integrated in the automatic machine.

European Patent Application Number 0 605 070 further purportedly refers to a method for transferring credit and debit amounts to and from chip cards, memory locations of a chip card having overwrite capability being divided into at least two memory areas, one of these having a "debit function", thus acting as an "electronic purse" similarly to a phone card, and the other having a "credit function" along the lines of a credit card. To replenish the "electronic purse", provision is made for cash amounts to be transferred between the areas under the secured conditions that are typical for credit cards.

To both avoid the danger of unauthorized access to the automatic teller machines and their permanently installed security modules, as well as eliminate the need for dedicated lines which are specially protected and, thus, expensive for the operator, in a method described in PCT Patent Application Number 95114, prior to any cash transaction, the operator of the automatic cash machine inserts a security module having chip card functions into the automatic cash machine. During each cash transaction that involves a cardholder inserting his or her electronic cash card into an automatic cash machine, data areas of the chip card are first read out to permit a plausibility check and to verify the remaining credit balance. Subsequently, an authentication is performed using the security module and a single or multiple acceptance decision is made. Finally, the cash amount due or input is either debited to the cardholder's chip card with the aid of a security function, or added to a summing counter for cash amounts in the security module. Following the cash transactions, the counter content of the security module having chip card functions is transferred to a clearinghouse.

SUMMARY OF THE INVENTION

An exemplary embodiment and/or exemplary method of the present invention is directed to enhancing the security of automatic cash machines for the electronic cash cards to prevent unauthorized manipulation and malfunctions.

Another exemplary embodiment and/or exemplary method of the present invention is directed to loading input data into an algorithm or a program when performing a cash transaction authentication between an electronic cash chip car and a security module. The program may be a vehicle for executing an algorithm, including a software module, etc.

BRIEF DESCRIPTION OF THE DRAWINGS

FIG. 5 shows a diagram of another exemplary method and/or embodiment according to the present invention.

DETAILED DESCRIPTION

Figure 1:
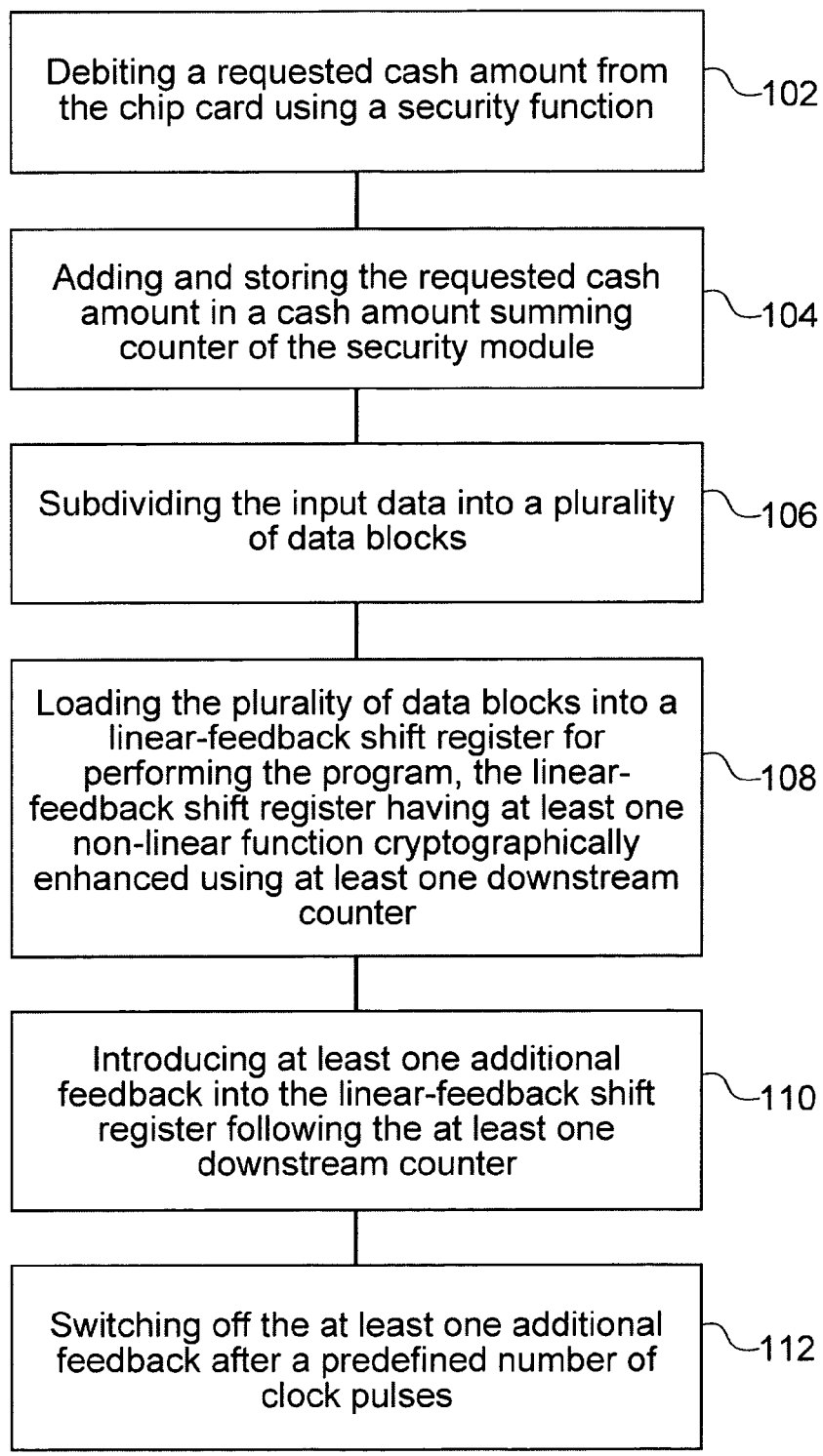
FIG. 1 shows a block diagram of an exemplary method and/or embodiment according to the present invention.

FIG. 1 shows a block diagram of an exemplary method according to the present invention for loading input data into a program when performing a cash transaction authentication between an electronic cash chip card and a security module, the chip card including a stored credit balance. As shown in block 102, a cash amount requested, preferably input by the cardholder, is debited from an electronic cash chip card using a security function. The requested cash amount is added and stored in a cash amount summing counter of a security module, as shown in block 104. Then, as shown in block 106, input data is subdivided into a plurality of data blocks. According to the present invention, the data blocks are loaded into a linear-feedback shift register for performing the linear-feedback shift register having at least one nonlinear function cryptographically enhanced using at least one downstream counter, as shown in block 110. Lastly, as shown in block 112, the at least one additional feedback is switched off after a predefined number of clock pulses.

Figure 2:
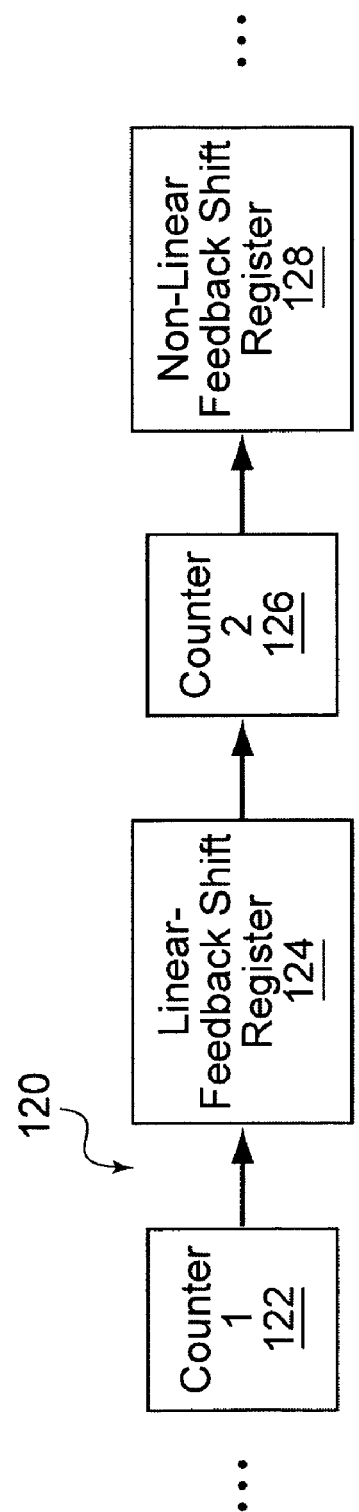
FIG. 2 shows a block diagram of another exemplary method and/or embodiment according to the present invention.

FIG. 2 shows a block diagram of an exemplary device 120 according to the present invention for loading input data into a program when performing an authentication using a cryptographic MAC function. The device 120 shown includes a first counter 122. The device 120 further includes a first linear-feedback shift register 124 which may have a nonlinear feed-forward function for reading off from the first linear-feedback shift register 124 and for influencing an output of the first linear-feedback shift register 124 using the first counter 122. The device 120 further includes at least one second counter 126 for performing a program associated with the present invention, the at least one second counter 126 being connected downstream, that is, after, the first linear-feedback shift register 124. The device 120 further includes at least one additional non-linear feedback shift register 128 for cryptographically enhancing the device 120, the at least one additional non-linear feedback shift register 128 being disconnectable from the device 120. In this exemplary device 120, the first counter 122 and/or the at least one second counter 126 may be subdivided or reduced.

Authentication algorithms may be used to enable reliable identification. Often entering into the authentication methods, besides the identity of a chip card, a person, and/or a security module SM, are other data, which have to be verified. An authentication method can be applied, for example, to non-secret card data D, together with a secret key K, and a random number Z. For the sake of security when working with electronic cash cards, separate security functions may be used for debiting and crediting, and each of these security functions may be retrieved using a cryptographic checksum.

Figure 3:
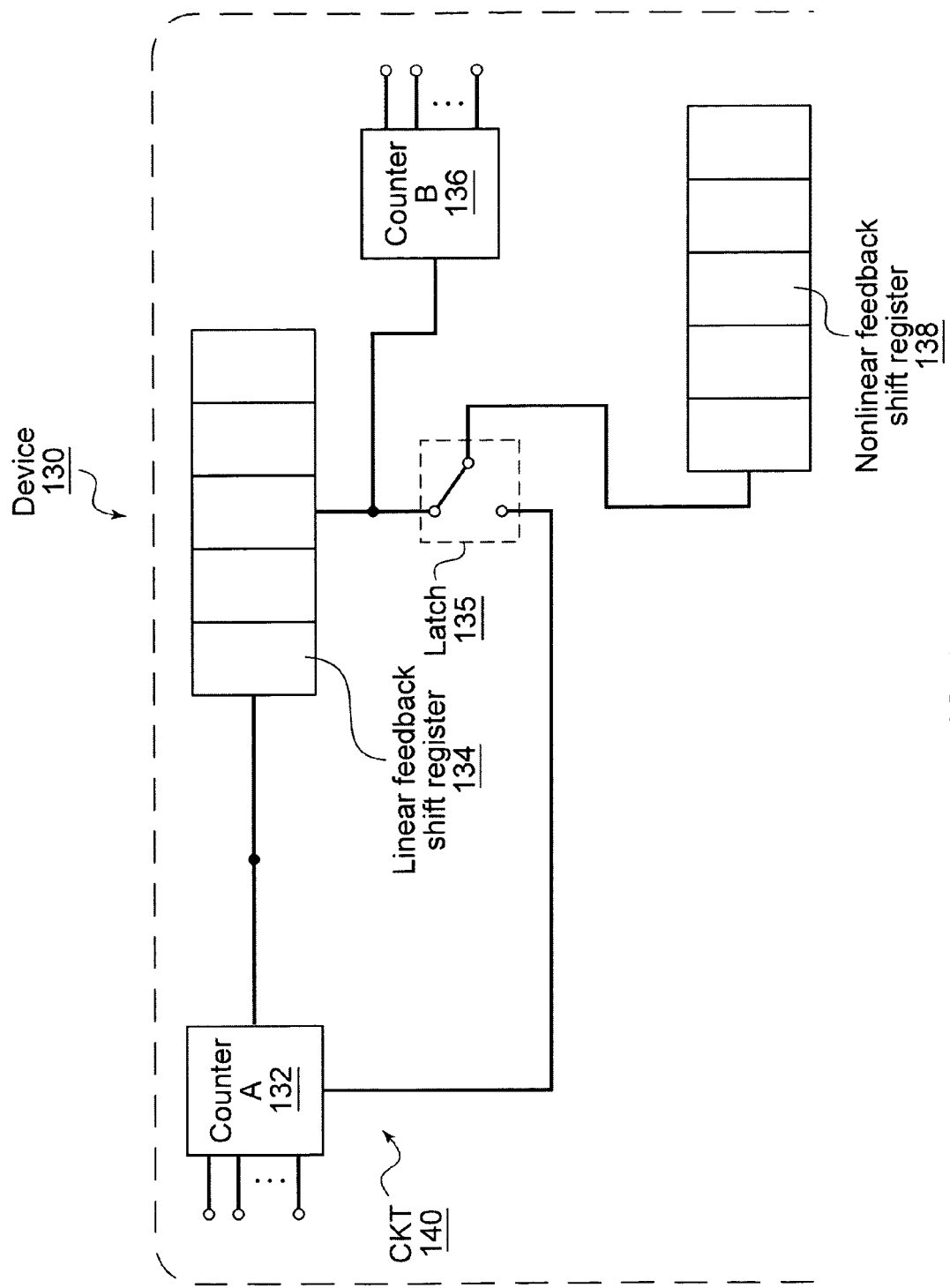
FIG. 3 shows a diagram of another exemplary method and/or embodiment according to the present invention.

FIG. 3 shows a diagram of an exemplary device 130 according to the present invention for loading input data into a program when performing an authentication using a cryptographic MAC function. The device 130 shown includes a circuit 140. Circuit 140 includes counter A 132. Counter A is connected to both linear feedback shift register 134 and latch 135. The linear feedback shift register 134 may have a nonlinear feed-forward function for reading off from the linear-feedback shift register 134 and for influencing an output of the linear-feedback shift register 134 using counter A 132. The device 130 further includes at least one counter B 136 for performing a program associated with the present invention. Counter B 136 is connected downstream from the linear-feedback shift register 134. The device further may include at least one non-linear feedback shift register 138 for cryptographically enhancing the device 130, the at least one additional non-linear feedback shift 138 being disconnectable via latch 135 from the device 130. In this exemplary device 130, counter A 132 and/or counter B 136 can may be subdivided or reduced.

Figure 4:
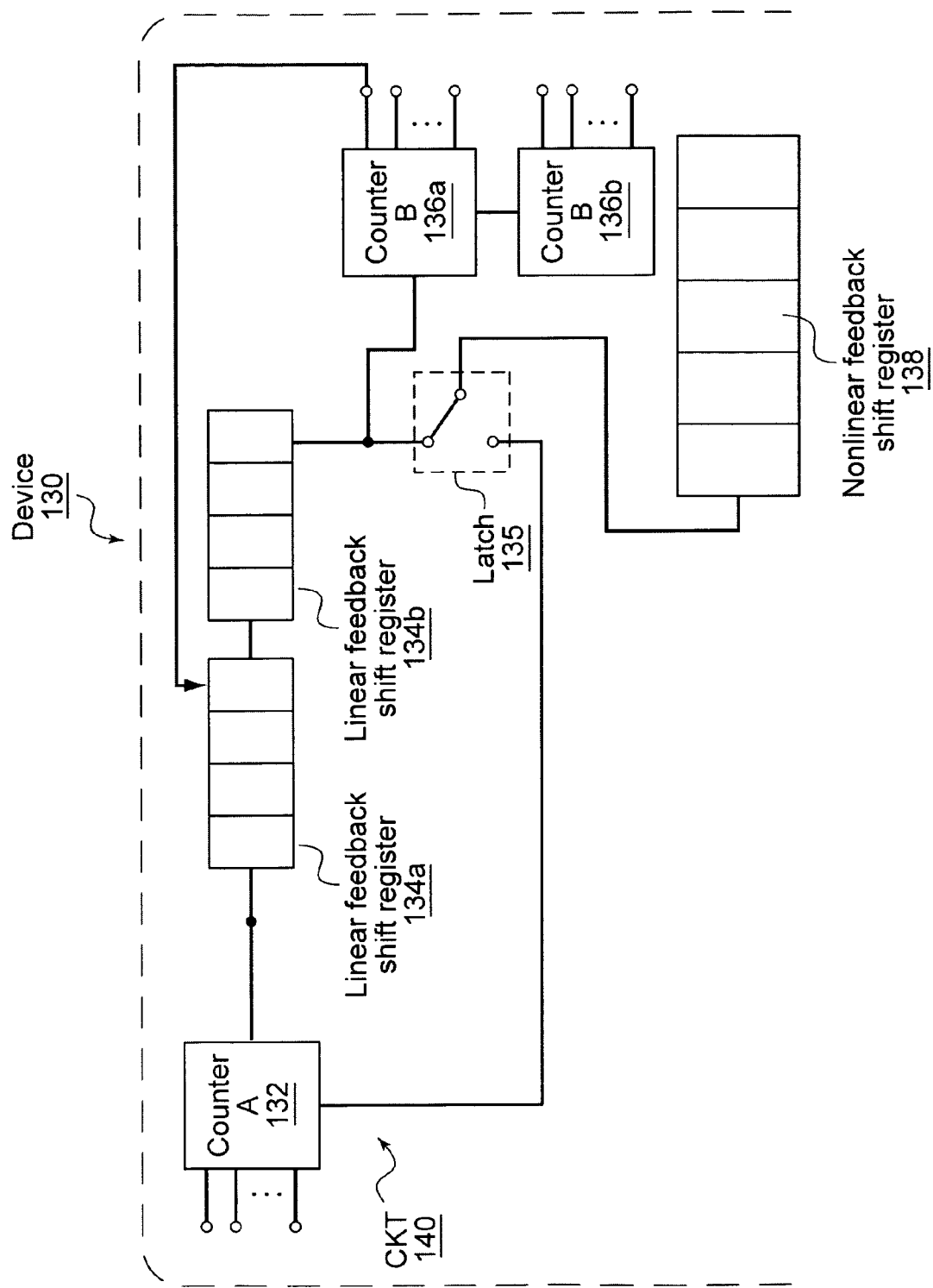
FIG. 4 shows a diagram of another exemplary method and/or embodiment according to the present invention.

FIG. 4 shows a diagram of an exemplary device 130 similar to the device shown in FIG. 3, and including multiple linear-feedback shift registers 134a, 134b (in place of linear-feedback shift register 134) and multiple counters 136a, 136b (in place of counter B 136). Further, FIG. 4 shows feedback from a first downstream counter 136a being provided into the linear feedback shift register 134a. The first downstream counter 136a is arranged before latch 135.

FIG. 5 shows a flow chart of an exemplary method of the present invention. A device for loading input data into a program when performing an authentication using a cryptographic MAC function is provided and includes a first counter 200. A linear-feedback shift register having a nonlinear feed-forward function for reading off from the linear-feedback shift register and for influencing an output of the linear feedback shift register using the first counter is provided, the linear-feedback shift register forming at least part of a circuit 202. At least one second counter for performing the program is connected downstream of the linear-feedback shift register 204. An additional non-linear feedback shift register is provided for cryptographically enhancing the circuit and being connected to the circuit, the at least one additional nonlinear feedback shift register being disconnectable 206. The device further provides a latch 208. And, additional feedback is generated as an XOR sum of readouts following a first of the at least one second downstream counter before the latch, from the latch following the first of the at least one second downstream counter, and following a second of the at least one second downstream counter 210.

Exemplary methods of the present invention enable the debit and credit transactions to be carried out using a cryptographic token, where it is required that the authentication and cryptographic checksum process are performed on the counter content using a challenge/response method. A single challenge/response method can then be applied, whereby only one random number is provided by the security module SM and only one response is calculated by the chip card, to verify both the identity (authentication) as well as the internal counter content with respect to the security module SM.

This may be achieved with the variable input data, such as the counter content and the random number, being initially processed internally using "keyed hash functions," that is, MAC functions. In the process, the card-specific secret key of the chip card is used as the key. The two tokens extracted from the counter content and the random number may then be linked together, for example, (in a perhaps cryptographically unsecured way) by XOR or using a linear-feedback shift register, and then may be output, with their integrity being protected, using a cryptographic function that is sufficiently powerful.

This exemplary method of the present invention provides that the keyed hash functions, which are only used internally, do not have to meet any particularly high requirements with regard to their security, and relatively simple functions can be used since the results of these functions do not leave the chip card. Nevertheless, data manipulation may be effectively prevented with this exemplary method.

A further exemplary method and/or exemplary embodiment of the present invention may assume that a linear-feedback shift register (LFSR) having an additional nonlinear function and downstream counters is used. Exemplary steps and features include that:

additional feedback circuits are switched into the linear-feedback shift register LFSR following the downstream counters;

input data, composed of the non-secret card data D and the secret key K, are read into the linear-feedback shift register LFSR, while both the feedback of the linear-feedback shift register LFSR, as well as the additional feedback(s) are active;

a certain number of clock pulses is processed without additional input data being read in;

input data made up of the random number R are read in while both the feedback of the LFSR and the additional feedback(s) are active;

the additional feedback circuits are switched off, and the counters are reset, if necessary; and/or a certain number of clock pulses, for example, a third number of pulses of the clock, is processed, and, during these pulses, output bits are generated according to the current counter settings.

A further exemplary method for loading input data into a program when performing a cash transaction authentication between and electronic cash chip card and a security module, the chip card including a stored credit balance, involves debiting a requested cash amount from the chip card using a security function. The requested cash amount is added and stored in a cash amount summing counter of the security module. The input data is subdivided into a plurality of data blocks. The plurality of data blocks are loaded into a linear-feedback shift register for performing the program. The linear-feedback shift register has at least one non-linear function cryptographically enhanced using at least one downstream counter. At least one additional feedback is introduced into the linear-feedback shift register following the at least one downstream counter. The at least one additional feedback is switched off after a predefined first number of pulses of an associated clock. The at least one downstream counter and the first number of clock pulses are selected so as to enable calculating an authentication token to be based on a second number of clock pulses.

What is claimed is:

1. A method for loading input data into a program when performing a cash transaction authentication between and electronic cash chip card and a security module, the chip card including a stored credit balance, the method comprising:
debiting a requested cash amount from the chip card using a security function;
adding and storing the requested cash amount in a cash amount summing counter of the security module,
subdividing the input data into a plurality of data blocks;
loading the plurality of data blocks into a linear-feedback shift register for performing the program, the linear-feedback shift register having at least one non-linear function cryptographically enhanced using at least one downstream counter;
introducing at least one additional feedback into the linear-feedback shift register following the at least one downstream counter; and
switching off the at least one additional feedback after a predefined first number of pulses of an associated clock.

2. The method as recited in claim 1 wherein the input data includes at least a random number, a secret key, and non-secret chip card data.

3. The method as recited in claim 1 wherein the input data includes at least a random number, a secret key, and non-secret chip card data, the secret key being associated with the non-secret chip card data, the input data being subdivided so that the non-secret chip card data and the secret key form a first data block and the random number forms a second data block.

4. The method as recited in claim 1 further comprising calculating an authentication token, wherein a different contents of the at least one downstream counter are used during the loading step than are used after the loading step in the calculating the authentication token.

5. The method as recited in claim 1 wherein a first downstream counter of the at least one downstream counter counts to 1.

6. The method as recited in claim 1 further comprising calculating an authentication token, wherein the at least one downstream counter and the first number of clock pulses are selected so as to enable the calculating of the authentication token to be based on a second number of clock pulses.

7. The method as recited in claim 1 further comprising outputting bits after the loading is completed.

8. The method as recited in claim 1 wherein the linear-feedback shift register forms at least part of a circuit, and further comprising:
outputting bits after the loading of the blocks is completed; and
pulsing the circuit for a third number of pulses of the clock while maintaining the at least one additional feedback between the loading of the blocks and the outputting of the bits.

9. The method as recited in claim 1 wherein the linear-feedback shift register forms at least part of a circuit, and further comprising:
outputting bits after the loading of the blocks is completed;
switching off the at least one additional feedback; and
pulsing the circuit for a third number of pulses of the clock after the switching off of the at least one additional feedback.

10. A device for loading input data into a program when performing an authentication using a cryptographic MAC function, the device comprising:
a first counter;
a linear-feedback shift register having a nonlinear feedforward function for reading off from the linear-feedback shift register, and for influencing an output of the linear feedback shift register using the first counter, the linear-feedback shift register forming at least part of a circuit;
at least one second counter for performing the program, the at least one second counter connected downstream of the linear-feedback shift register; and
at least one additional non-linear feedback shift register for cryptographically enhancing the circuit and being connected to the circuit, the at least one additional nonlinear feedback shift register being disconnectable.

11. The device as recited in claim 10 further comprising a latch, and wherein an additional feedback is tapped off following a first of the at least one second downstream counter and before the latch.

12. The device as recited in claim 10 further comprising a latch, and wherein an additional feedback is read off from the latch following a first of the at least one second downstream counter.

13. The device as recited in claim 10 wherein an additional feedback is read off following a second of the at least one second downstream counter.

14. The device as recited in claim 10 further comprising a latch, and wherein an additional feedback is generated as an XOR sum of readouts following a first of the at least one second downstream counter before the latch, from the latch following the first of the at least one second downstream counter, and following a second of the at least one second downstream counter.

15. The device as recited in claim 10 wherein the first counter and the at least one second counter are subdivided or reduced.

* * * * *